United States Patent Office 3,597,202

Patented Aug. 3, 1971

3,597,202

PHOTO POLYMERIZATION PROCESS

Edward Cerwinka, Binghamton, N.Y., assignor to GAF Corporation, New York, N.Y.

No Drawing. Filed Nov. 4, 1968, Ser. No. 773,699
Int. Cl. G03c *1/68*
U.S. Cl. 96—35.1 11 Claims

ABSTRACT OF THE DISCLOSURE

A process for photopolymerizing a normally liquid to normally solid monomer having the grouping $CH_2=C<$ which comprises subjecting the monomer to electromagnetic radiation so as to produce exposed and unexposed areas in the presence of a catalyst comprising a compound of the formula:

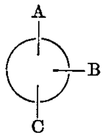

wherein A represents an oxo radical, B represents a diazo radical, C represents a sulfonic acid radical and the circle represents a ring system selected from the group consisting of cyclohexane, cyclohexene, cyclohexadiene, naphthalene, decahydronaphthalene, octahydronaphthalene and hexahydronaphthalene; thereafter contacting the exposed monomer with a reducing agent so as to polymerize the monomer in the exposed areas and subsequently removing the material from the unexposed areas so as to produce a colored negative image corresponding to the photopolymerized polymer.

The instant invention relates to a photopolymerization process and in particular to photopolymerizable compositions which develop color during exposure to light in a manner similar to that of a silver halide pirnt-out paper.

In general, images which are produced by a photopolymerization process are not colored. The vinyl monomers which are employed in these processes do not possess chromophoric groups unless said monomers are especially prepared with this objective in view. In the past, several attempts have been made to develop photopolymerization processes, the images of which are colored. One of the processes previously employed is a dye-sensitized photopolymerization process wherein the dye is photobleached to a leuco form during the exposure of said dye to radiation. Subsequently, the color returns as a result of the aerial oxidation of the leuco dye. The dyes employed in this process, however, are water-soluble and are therefore eventually removed during the washout step. Another process involves a polymerization which is sensitized by a metal salt. A light sensitive metal complex such as ferrioxlate which possesses some degree of color density and thus enables it to absorb light in the visible region of the spectrum is employed in this type process. Actinic radiation photolyzes the complex, leaving a colorless salt of the metal in its lower valence state. Still another process in which color is imparted to a photopolymer is one in which the color is imparted by means of a subsequent chemical or physical development. An example of this type process is one in which a relief image is stained with a basic dye. Yet another technique has involved the dispersion of an oil soluble dye such as nigrosine in the photopolymerizable composition. Other coloration methods have included techniques wherein the production of a photopolymer is accompanied by the formation of a silver print-out image from a silver halide emulsion. This system is one of the few wherein the formation of a visible print-out image accompanies photopolymer formation. The above processes and additional prior art processes are disclosed in U.S. Pats. 2,850,445, 3,101,270 and 3,130,050.

The object of the instant invention is to provide a photopolymerization process and a composition useful in the formation of a photoreproduction in which a visible print-out image accompanies photopolymer formation.

Another object of the instant invention is to provide a photopolymerizable composition comprising a diazo-oxide dye, a polymerizable monomer and a binder which composition is designed for use in a photopolymerization process. These and other objects of the instant invention will be evident from the following description of the instant invention. According to the instant invention a photopolymerizable composition comprising a diazo-oxide dye, polymerizable monomer and a binding agent is prepared. The composition is then coated on a suitable support element and said composition, which is essentially colorless so long as it is protected from visible light, upon exposure to actinic radiation develops colored azo dyes in the exposed areas. This reaction is further described in Annalen, Sues, O., V.5564:69 (1944). The exposed sample is then immersed in an aqueous solution of a strong reducing agent. As a consequence of the immersion in the reducing bath, the monomer is polymerized in the light exposed areas and the print-out color is retained by the polymeric image. The sample is then washed and the washing process removes all the unpolymerized areas which are also the areas which have remained uncolored. This photoreproduction system is a negative working system in that the colored photopolymer is produced in the areas which have been exposed to light.

The photo formation of the azo dye may be represented by the following equations:

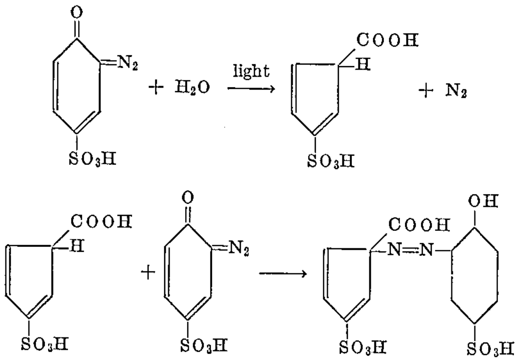

It has been shown that the photo formed azo dye is not itself an initiator of polymerization. This is demonstrated by the fact that no polymer is formed when the exposed sample is immersed in water rather than in a reducing bath. When the sample is immersed in water, the entire coated layer together with its print-out image is found to have dissolved. Therefore, the formation of a polymer in the exposed areas requires the immersion of an exposed sample in a reducing bath which may comprise any of the well-known reducing agents such as stannous chloride, ascorbic acid, and compounds of the various metals such as nickel, copper, iron and zinc. Preferably an aqueous solution of stannous chloride is employed. It is presumed that during the chemical reduction of the azo dye by a reducing agent such as stannous chloride free radical intermediates are formed. Azo dyes are known to be reduced to aniline derivatives by the action of strong reducing agents such as stannous chloride or sodium hydrosulfide as is disclosed by Laar, C. Berichte, pages 1930–1931 (1881). Therefore, it is assumed that a dye such as that formed by the print-out of the present invention would be reduced in the following manner:

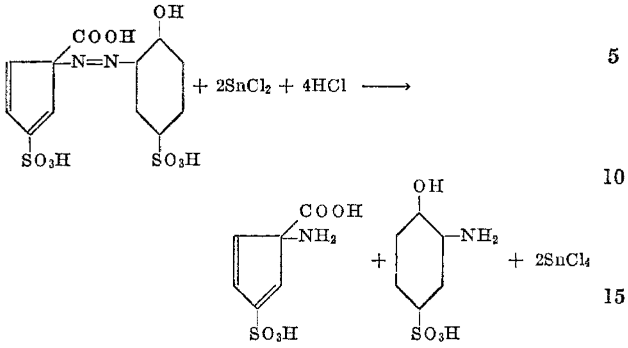

The imino radical intermediate thus formed could function as an initiator of the polymerization process and only a relatively few radicals of this type need be formed since the majority of the azo dye is not reduced. Such initiating radicals may include but are not limited to one or both of the following formulas:

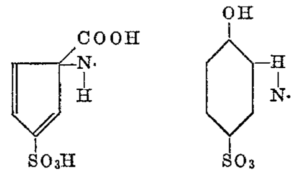

Radicals of this type appear to form the polymeric image more effectively in an acid medium rather than an alkaline medium and the pH of the reducing bath should therefore be adjusted accordingly. Useful diazo-oxide compounds which may be employed in connection with the instant invention are those compounds which have the general formula:

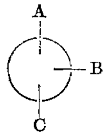

wherein A represents an oxo radical, B represents a diazo radical and C represents a sulfonic acid radical and the circle represents a ring system which may be either a single cyclic saturated or unsaturated compound or a bicyclic compound which is either saturated or unsaturated. Therefore, the useful diazo-oxide compounds include but are not limited to:

3-diazo-4-oxo-1,5-cyclohexadiene-1-sulfonic acid
3-oxo-4-diazo-1,5-cyclohexadiene-1-sulfonic acid
3-diazo-4-oxo-decahydro-naphthalene-1-sulfonic acid
3-oxo-4-diazo-decahydro-naphthalene-1-sulfonic acid
3-diazo-4-oxo-1-octahydro-naphthalene-1-sulfonic acid
3-oxo-4-diazo-1-octahydro-naphthalene-1-sulfonic acid
3-diazo-4-oxo-1,5-hexahydro-naphthalene-1-sulfonic acid
3-oxo-4-diazo-1,5-hexahydro-naphthalene-1-sulfonic acid
3-diazo-4-oxo-naphthalene-1-sulfonic acid and those compounds disclosed by Sues, O., Annalen, 556:65–84 (1944) and Kosar, J. "Light Sensitive Systems," John Wiley and Sons, New York (1965).

Any normally liquid to solid photopolymerizable unsaturated organic compound is suitable in the practice of my invention. Preferably, such compounds should be ethylenically unsaturated, i.e., contain at least one non-aromatic double bond between adjacent carbon atoms. Compounds particularly advantageous are the photopolymerizable vinyl or vinylidene compounds containing a $CH_2{=}C<$ group activated by direct attachment to an electro-negative group such as halogen, C=O, —C≡N, —C≡C, —O—. Examples of such photopolymerizable unsaturated organic compounds include arcylamide, acrylonitrile, N-ethanol acrylamide, methacrylic acid, acrylic acid, calcium acrylate, methacrylamide, vinyl acetate, methyl methacrylate, methyl acrylate, ethyl acrylate, vinyl benzoate, vinyl pyrolidone, vinyl methyl ether, vinyl butyl ether, vinyl isopropyl ether, vinyl isobutyl ether, vinyl butyrate, butadiene or mixtures of ethyl acrylate with vinyl acetate, acrylonitrile with styrene, butadiene with acrylonitrile and the like.

The above ethylenically unsaturated organic compounds, or monomers as they are sometimes called, may be used either alone or in admixture in order to vary the physical properties such as molecular weight, hardness, etc. of the final polymer. Thus, it is a recognized practice, in order to produce a vinyl polymer of the desired physical properties, to polymerize in the presence of a small amount of an unsaturated compound containing at least two terminal vinyl groups each linked to a carbon atom in a straight chain or in a ring. The function of such compounds is to cross-link the polyvinyl chains. This technique as used in polymerization, is further described by Kropa and Bradley in vol. 31, No. 12, of Industrial and Engineering Chemistry, 1939. Among such cross-linking agents for the purpose described herein may be mentioned N,N'-methylene-bis-acrylamide, triallyl cyanurate, divinyl benzene, divinyl ketones and diglycol diacrylate. Suitable colloid carriers for this purpose include polyvinyl alcohol, casein, glue, saponified cellulose acetate, carboxymethyl cellulose, starch, polyvinylpyrrolidone, hydroxyethylcellulose and gelatin.

Numerous materials are suitable as supports or bases for the radiation sensitive plates prepared in accordance with the process described herein such as cellulose ester supports including the hydrophobic variety or the type having a surface made hydrophilic by a partial saponification, metals such as aluminum or zinc, terephthalic acid ester polymers, paper, glass or the like.

The instant invention is, of course, suitable for use in the field of photography in the production of colored images, and it may also be employed in the production of printing plates for use in the graphic arts. Other similar uses for photopolymerization processes are also possible in connection with the instant invention, and will be obvious to those skilled in the art.

The present invention will now be described by reference to the following specific examples. Such examples are presented for purposes of illustration only, and the present invention is in no way to be deemed as limited thereto.

EXAMPLE I

A light-sensitive solution was prepared in yellow safelight with the following as components:

Polyvinylpyrrolidone, K–90 (GAF)—1.000 g.
N,N'-methylenebisacrylamide (recrystallized twice from water)—0.250 g.
3-diazo-4-oxo-1,5-cyclohexadiene-1-sulfonic acid—0.200 g.
"Wetsit" spreading agent, 10% aqueous solution—.08 ml.
Water, to—25 ml.

The solution was poured onto a glass plate that had been appropriately subbed to receive the solution. The coated plate was whirled five minutes on a coating machine (Addressograph-Multigraph), then allowed to dry in the dark at room temperature for about an hour.

A sample was cut from the plate and exposed through a Stouffer Graphic Arts step tablet to the light from a 375-watt reflector lamp for a period of one minute at a distance of fifteen inches. The light intensity as measured by an ultraviolet light-exposure meter read 640 microwatts per square cm. After the exposure the sample displayed an orange-yellow print-out image of the exposed areas. The sample was now immersed for a few seconds in a tray of aqueous stannous chloride, five percent. It was then bathed in a tray of deionized water for a few minutes. The waterwash was found to remove the unploymerized areas, leaving an orange-yellow colored polymeric image of the exposed areas. The number of colored photopolymer steps observed was six.

EXAMPLE II

The procedure of Example I was repeated substituting 3-oxo-4-diazo-1,5-cyclohexadiene-1-sulfonic acid for 3-diazo-4-oxo-1,5-cyclohexadiene-1-sulfonic acid. The same results were observed as were described for Example I.

EXAMPLE III

The procedure of Example I was repeated substituting 3-diazo-4-oxo-decahydronaphthalene-1-sulfonic acid for 3-diazo-4-oxo-1,5-cyclohexadiene-1-sulfonic acid. The same results were observed as were described for Example I.

EXAMPLE IV

The procedure of Example I was repeated substituting 3-oxo-4-diazo-decahydro-naphthalene-1-sulfonic acid for 3-diazo-4-oxo-1,5-cyclohexadiene - 1 - sulfonic acid. The same results were observed as were described for Example I.

EXAMPLE V

The procedure of Example I was repeated substituting 3-diazo-4-oxo-1-octahydronaphthalene-1-sulfonic acid for 3-diazo-4-oxo-1,5-cyclohexadiene - 1 - sulfonic acid. The same results were observed as were described for Example I.

EXAMPLE VI

The procedure of Example I was repeated substituting 3-oxo-4-diazo-1-octahydronaphthalene-1-sulfonic acid for 3-diazo-4-oxo-1,5-cyclohexadiene - 1 - sulfonic acid. The same results were observed as were described for Example I.

EXAMPLE VII

The procedure of Example I was repeated substituting 3-diazo-4-oxo-1,5-hexahydronaphthalene-1 - sulfonic acid for 3-diazo-4-oxo-1,5-cyclohexadiene-1-sulfonic acid. The same results were observed as were described for Example I.

EXAMPLE VIII

The procedure of Example I was repeated substituting 3-oxo-4-diazo-1,5-hexahydronaphthalene-1 - sulfonic acid for 3-diazo-4-oxo-1,5-cyclohexadiene-1-sulfonic acid. The same results were observed as were described for Example I.

EXAMPLE IX

The procedure of Example I was repeated substituting 3-diazo-4-oxo-naphthalene-1-sulfonic acid for 3-diazo-4-oxo-1,5-cyclohexadiene-1-sulfonic acid. The same results were observed as were described for Example I.

EXAMPLE X

The procedure of Example I was repeated substituting aqueous ascorbic acid for the stannous chloride. The same results were observed as were described for Example I.

EXAMPLE XI

The procedure of Example I was repeated substituting ferrous chloride for stannous chloride. The same results were observed as were described for Example I.

EXAMPLE XII

The procedure of Example I was repeated substituting cuprous chloride for stannous chloride. The same results were observed as were described for Example I.

EXAMPLE XIII

The procedure of Example I was repeated substituting ferrous ammonium oxalate for stannous chloride. The same results were observed as were described for Example I.

EXAMPLE XIV

The procedure of Example I was repeated substituting ferrous ammonium sulfate for stannous chloride. The same results were observed as were described for Example I.

While various preferred embodiments of the present invention have been illustrated by way of specific example, it is to be understood that the present invention is in no way to be deemed as limited thereto, but should be construed as broadly as all or any equivalents thereof.

I claim:

1. A process for photopolymerizing a normally liquid to normally solid monomer containing the grouping $CH_2=C<$ comprising (1) exposing said monomer to electromagnetic radiation having a wave length extending from the ultraviolet through the visible range so as to produce exposed and unexposed areas in the presence of a catalyst comprising a compound of the formula:

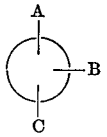

wherein A represents an oxo radical, B represents a diazo radical, C represents a sulfonic acid radical and the circle represents a ring system selected from the group consisting of cyclohexane, cyclohexene, cyclohexadiene, naphthalene, decahydronaphthalene, octahydronaphthalene and hexahydronaphthalene, (2) contacting the exposed monomer with a reducing agent selected from the group consisting of aqueous ascorbic acid, stannous chloride, ferrous chloride, cuprous chloride, ferrous ammonium oxalate, and ferrous ammonium sulfate so as to polymerize the monomer in the exposed areas, and (3) thereafter removing the material from the unexposed areas.

2. The process as defined in claim 1 wherein the catalyst is 3-diazo-4-oxo-1,5-cyclohexadiene-1-sulfonic acid.

3. The process as defined in claim 1 wherein the catalyst is 3-oxo-4-diazo-1,5-cyclohexadiene-1-sulfonic acid.

4. The process as defined in claim 1 wherein the catalyst is 3-diazo-4-oxo-decahydronaphthalene-1-sulfonic acid.

5. The process as defined in claim 1 wherein the catalyst is 3-oxo-4-diazo-decahydronaphthalene-1-sulfonic acid.

6. The process of claim 1 wherein the reducing agent is stannous chloride.

7. A process for producing by photopolymerization a photographic image which comprises (1) exposing to electromagnetic radiation having a wave length extending from the ultraviolet through the visible region, a photographic element comprising the support having thereon a radiation sensitive layer comprising a normally liquid to normally solid monomer containing the grouping $CH_2=C<$ and a colloid carrier therefor and a catalyst for said polymerization so as to produce exposed and unexposed areas, said catalyst comprising a diazo oxide compound of the formula:

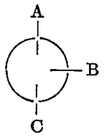

wherein A represents an oxo radical, B represents a diazo radical, C represents a sulfonic acid radical and the circle represents a ring system selected from the group consisting of cyclohexane, cyclohexene, naphthalene, decahydronaphthalene, octahydronaphthalene and hexahydronaphthalene, (2) contacting the exposed monomer with a reducing agent selected from the group consisting of aqueous stannous chloride, ascorbic acid, ferrous chloride, cuprous chloride, ferrous ammonium oxalate, and ferrous ammonium sulfate so as to polymerize the monomer in the exposed areas; and (3) thereafter removing the material from the unexposed areas.

8. The process of claim 7 wherein the colloid carrier is gelatin.

9. The process of claim 7 wherein the colloid carrier is polyvinylpyrrolidone.

10. The process of claim 1 wherein the material is removed from the unexposed areas by water washing.

11. The process of claim 7 wherein the material is removed from the unexposed areas by water washing.

References Cited

UNITED STATES PATENTS

| | | | |
|---|---|---|---|
| 2,875,047 | 2/1959 | Oster | 96—115 |
| 2,990,281 | 6/1961 | Printy et al. | 96—35.1 |
| 3,255,004 | 6/1966 | Thommes | 96—35.1 |
| 3,218,167 | 11/1965 | Mefuchen et al. | 96—35.1 |

WILLIAM D. MARTIN, Primary Examiner

M. SOFOELEOUS, Assistant Examiner

U.S. Cl. X.R.

96—33, 36.3, 49, 91, 115; 260—141

PO-1050
(5/69)

UNITED STATES PATENT OFFICE
CERTIFICATE OF CORRECTION

Patent No. 3,597,202 Dated August 3, 1971

Inventor(s) Edward Cerwonka

It is certified that error appears in the above-identified patent and that said Letters Patent are hereby corrected as shown below:

Column 1, line 2, change the inventor's last name from "Cerwinka" to -- Cerwonka --

Signed and sealed this 4th day of January 1972.

(SEAL)
Attest:

EDWARD M.FLETCHER,JR.
Attesting Officer

ROBERT GOTTSCHALK
Acting Commissioner of Patents

Disclaimer

3,597,202.—*Edward Cerwonka,* Binghamton, N.Y. PHOTO POLYMERIZATION PROCESS. Patent dated Aug. 3, 1971. Disclaimer filed Sept. 30, 1982, by the assignee, *Eastman Kodak Co.*

Hereby enters this disclaimer to all claims of said patent.

[*Official Gazette March 22, 1983.*]